(12) United States Patent
Shi et al.

(10) Patent No.: US 11,002,839 B2
(45) Date of Patent: May 11, 2021

(54) METHOD AND APPARATUS FOR MEASURING ANGULAR RESOLUTION OF MULTI-BEAM LIDAR

(71) Applicant: Baidu Online Network Technology (Beijing) Co., Ltd., Beijing (CN)

(72) Inventors: Tingmin Shi, Beijing (CN); Chongchong Li, Beijing (CN); Yuan Jiang, Beijing (CN); Chao Wang, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 394 days.

(21) Appl. No.: 16/025,488

(22) Filed: Jul. 2, 2018

(65) Prior Publication Data

US 2019/0011542 A1    Jan. 10, 2019

(30) Foreign Application Priority Data

Jul. 4, 2017    (CN) .......................... 201710539514.8

(51) Int. Cl.
| | |
|---|---|
| *G01S 7/497* | (2006.01) |
| *G01B 11/26* | (2006.01) |
| *G01S 17/02* | (2020.01) |
| *G01S 17/89* | (2020.01) |
| *G01S 17/86* | (2020.01) |

(52) U.S. Cl.
CPC ............. *G01S 7/497* (2013.01); *G01B 11/26* (2013.01); *G01S 17/86* (2020.01); *G01S 17/89* (2013.01)

(58) Field of Classification Search
CPC .......... G01S 7/497; G01S 17/89; G01S 17/86; G01B 11/26
USPC ....................................................... 356/5.01
See application file for complete search history.

(56) References Cited

U.S. PATENT DOCUMENTS

2016/0274589 A1    9/2016    Templeton

FOREIGN PATENT DOCUMENTS

| CN | 103983961 A | 8/2014 |
| CN | 105678783 A | 6/2016 |
| CN | 106249239 A | 12/2016 |
| CN | 106644077 A | 5/2017 |

*Primary Examiner* — Daniel L Murphy
(74) *Attorney, Agent, or Firm* — Nixon Peabody LLP

(57) ABSTRACT

A method and apparatus for measuring an angular resolution of a multi-beam lidar. The method includes: acquiring, when a checkerboard calibration plate is scanned by a multi-beam lidar, an image of the checkerboard calibration plate photographed by a camera; identifying a checkerboard in the image, and determining a physical length characterized by a unit pixel of the image based on shape and length information of each checker in the checkerboard calibration plate; determining a center light spot and a light spot pair in the image; determining an angle between a laser beam corresponding to each light spot of the light spot pair and a laser beam corresponding to the center light spot based on the physical length characterized by the unit pixel, the center light spot and the light spot pair; and determining the angular resolution of the multi-beam lidar based on the determined angle.

11 Claims, 4 Drawing Sheets

METHOD AND APPARATUS FOR MEASURING ANGULAR RESOLUTION OF MULTI-BEAM LIDAR

CROSS-REFERENCE TO RELATED APPLICATIONS

This application is related to and claims priority from Chinese Application No. 201710539514.8, filed on Jul. 4, 2017 and entitled "Method and Apparatus for Measuring Angular Resolution of Multi-beam Lidar," the entire disclosure of which is hereby incorporated by reference.

TECHNICAL FIELD

The present disclosure relates to the field of lidar technology, specifically to the field of multi-beam lidar technology, and more specifically to a method and apparatus for measuring an angular resolution of a multi-beam lidar.

BACKGROUND

Functioning as eyes on the autonomous vehicles, lidars play a pivotal role in the autonomous vehicles. The operating principle of a laser radar is: emitting a detecting signal (a laser beam) to a target by a laser emitter, receiving a signal (a target echo) reflected from the target by a laser receiver, comparing the received signal with the emitted signal, and properly processing the received signal to obtain relevant information of the target, such as distance, azimuth, height, speed, posture, or even shape, thereby detecting, tracking and identifying the target. At present, a multi-beam lidar including more than one laser emitter is usually used to obtain better detection results. Among the important characters of a multi-beam lidar, the angular resolution reflects laser emitter arrangement in the multi-beam lidar. When sensing the external environment, the smaller is the angular resolution, the higher is the data density of the collected laser point cloud, and the stronger is the environment sensing ability of the multi-beam lidar. The angular resolutions of the existing multi-lidars are generally given by the lidar manufacturer through measurement using a precise instrument or measured using a dot matrix.

However, the angular resolution parameter provided by the equipment manufacturer is not reliable, and the dot matrix measurement method is constrained by the receiver arrangement and is expensive.

SUMMARY

An objective of the present disclosure is to provide an improved method and apparatus for measuring an angular resolution of a multi-beam lidar, to solve one or more technical problems mentioned in the foregoing background section.

In a first aspect, an embodiment of the present disclosure provides a method for measuring an angular resolution of a multi-beam lidar, the multi-beam lidar including a center axis and at least one laser emitter, each laser emitter of the at least one laser emitter rotating around the center axis, the method including: acquiring, when a checkerboard calibration plate is scanned by the multi-beam lidar, an image of the checkerboard calibration plate photographed by a camera; identifying a checkerboard in the image, and determining a physical length characterized by a unit pixel of the image based on shape and length information of each checker in the checkerboard calibration plate; determining a center light spot and a light spot pair in the image, the center light spot being an image of a laser beam perpendicular to the checkerboard calibration plate among laser beams emitted by the at least one laser emitter in the image, and the light spot pair being two images of two laser beams emitted by two adjacent laser emitters of the at least one laser emitter in the image; determining an angle between a laser beam corresponding to each light spot of the light spot pair and a laser beam corresponding to the center light spot based on the physical length characterized by the unit pixel, the determined center light spot and the determined light spot pair; and determining the angular resolution of the multi-beam lidar based on the determined angle between the laser beam corresponding to the each light spot of the light spot pair and the laser beam corresponding to the center light spot.

In some embodiments, the determining an angle between a laser beam corresponding to each light spot of the light spot pair and a laser beam corresponding to the center light spot based on the physical length characterized by the unit pixel, the determined center light spot and the determined light spot pair includes: determining the angle for the each light spot of the light spot pair as follows: determining a pixel distance between the each light spot and the center light spot in an axial direction, the axial direction being a direction of a projection of the center axis on the checkerboard calibration plate; determining a distance between a projection of the laser beam corresponding to the each light spot on the checkerboard calibration plate and a projection of the laser beam corresponding to the center light spot on the checkerboard calibration plate based on the determined pixel distance and the physical length characterized by the unit pixel; and determining the angle between the laser beam corresponding to the each light spot and the laser beam corresponding to the center light spot based on the determined distance.

In some embodiments, the center axis is parallel to the checkerboard calibration plate; and the determining the angle between the laser beam corresponding to the each light spot and the laser beam corresponding to the center light spot based on the determined distance includes: calculating a ratio of the determined distance to a distance between the checkerboard calibration plate and the center axis; and determining an arctangent angle of the calculated ratio as the angle between the laser beam corresponding to the each light spot and the laser beam corresponding to the center light spot.

In some embodiments, the determining the angular resolution of the multi-beam lidar based on the determined angle between a laser beam corresponding to each light spot of the light spot pair and a laser beam corresponding to the center light spot includes: calculating an angular difference between an angle between a laser beam corresponding to a light spot of the light spot pair and the laser beam corresponding to the center light spot and an angle between a laser beam corresponding to another light spot of the light spot pair and the laser beam corresponding to the center light spot; and defining the calculated angular difference as the angular resolution of the multi-beam lidar.

In some embodiments, the camera is an infrared camera.

In a second aspect, an embodiment of the present disclosure provides an apparatus for measuring an angular resolution of a multi-beam lidar, the multi-beam lidar including a center axis and at least one laser emitter, each laser emitter of the at least one laser emitter rotating around the center axis, the apparatus including: an acquiring unit, configured for acquiring, when a checkerboard calibration plate is scanned by the multi-beam lidar, an image of the checkerboard calibration plate photographed by a camera; an identifying unit, configured for identifying a checkerboard in the image, and determining a physical length characterized by a unit pixel of the image based on shape and length information of each checker in the checkerboard calibration plate; a light spot determining unit, configured for determining a center light spot and a light spot pair in the image, the center light spot being an image of a laser beam perpendicular to the checkerboard calibration plate among laser beams emitted by the at least one laser emitter in the image, and the light spot pair being two images of two laser beams emitted by two adjacent laser emitters of the at least one laser emitter in the image; an angle determining unit, configured for determining an angle between a laser beam corresponding to each light spot of the light spot pair and a laser beam corresponding to the center light spot based on the physical length characterized by the unit pixel, the determined center light spot and the determined light spot pair; and an angular resolution determining unit, configured for determining the angular resolution of the multi-beam lidar based on the determined angle between the laser beam corresponding to the each light spot of the light spot pair and the laser beam corresponding to the center light spot.

In some embodiments, the angle determining unit is further configured for: determining the angle for the each light spot of the light spot pair as follows: determining a pixel distance between the each light spot and the center light spot in an axial direction, the axial direction being a direction of a projection of the center axis on the checkerboard calibration plate; determining a distance between a projection of the laser beam corresponding to the each light spot on the checkerboard calibration plate and a projection of the laser beam corresponding to the center light spot on the checkerboard calibration plate based on the determined pixel distance and the physical length characterized by the unit pixel; and determining the angle between the laser beam corresponding to the each light spot and the laser beam corresponding to the center light spot based on the determined distance.

In some embodiments, the center axis is parallel to the checkerboard calibration plate; and the angle determining unit is further configured for: calculating a ratio of the determined distance to a distance between the checkerboard calibration plate and the center axis; and determining an arctangent angle of the calculated ratio as the angle between the laser beam corresponding to the each light spot and the laser beam corresponding to the center light spot.

In some embodiments, the angular resolution determining unit includes: an angular difference calculating module, configured for calculating an angular difference between an angle between a laser beam corresponding to a light spot of the light spot pair and the laser beam corresponding to the center light spot and an angle between a laser beam corresponding to another light spot of the light spot pair and the laser beam corresponding to the center light spot; and an angular resolution determining module, configured for defining the calculated angular difference as the angular resolution of the multi-beam lidar.

In some embodiments, the camera is an infrared camera.

In a third aspect, an embodiment of the present disclosure provides an electronic device, the electronic device including: one or more processors; and a memory for storing one or more programs, where the one or more programs enable, when executed by the one or more processors, the one or more processors to implement the method according to any one of the implementations in the first aspect.

In a fourth aspect, an embodiment of the present disclosure provides a computer readable storage medium storing a computer program therein, where the computer program implements, when executed by a processor, the method according to any one of the implementations in the first aspect.

A method and apparatus for measuring an angular resolution of a multi-beam lidar provided by an embodiment of the present disclosure acquire, when a checkerboard calibration plate is scanned by a multi-beam lidar, an image of the checkerboard calibration plate photographed by a camera; then identify a checkerboard in the image, and determine a physical length characterized by a unit pixel of the image based on shape and length information of each checker in the checkerboard calibration plate; then determine a center light spot and a light spot pair in the image; then determine an angle between a laser beam corresponding to each light spot of the light spot pair and a laser beam corresponding to the center light spot based on the physical length characterized by the unit pixel, the determined center light spot and the determined light spot pair; and finally determine the angular resolution of the multi-beam lidar based on the determined angle between the laser beam corresponding to the each light spot of the light spot pair and the laser beam corresponding to the center light spot. Thus, the embodiment has realized measuring the angular resolution of the multi-beam lidar at a low cost, and has improved the reliability of the angular resolution parameter of the multi-beam lidar.

BRIEF DESCRIPTION OF THE DRAWINGS

By reading and referring to detailed description on the non-limiting embodiments in the following accompanying drawings, other features, objects and advantages of the present disclosure will become more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
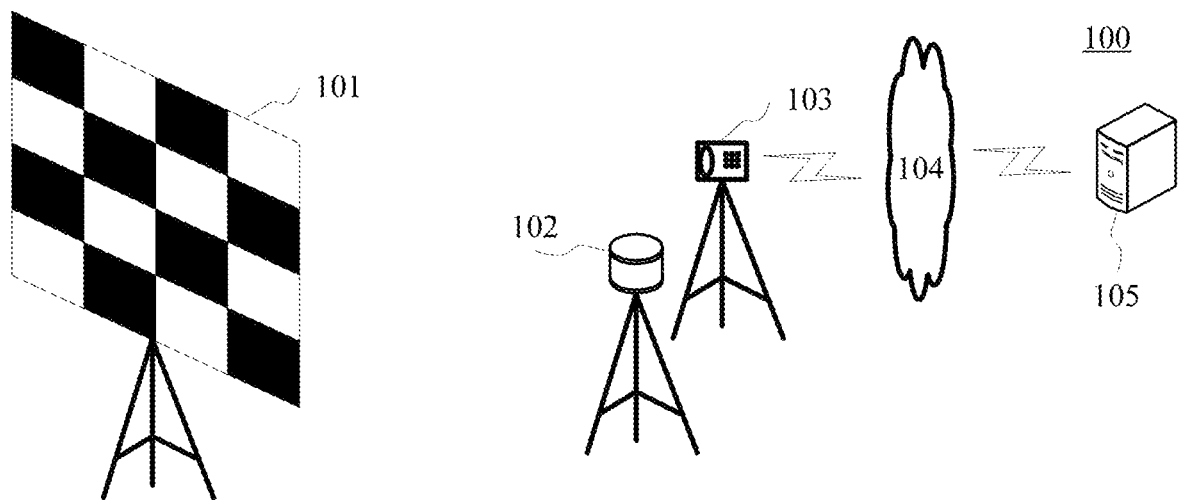
FIG. 1 is an architectural diagram of an exemplary system in which the present disclosure may be implemented.

FIG. 1 shows an exemplary system architecture 100 in which an embodiment of a method for measuring an angular resolution of a multi-beam lidar or an apparatus for measuring an angular resolution of a multi-beam lidar according to the present disclosure may be implemented.

As shown in FIG. 1, a system architecture 100 may include a checkerboard calibration plate 101, a multi-beam lidar 102, a camera 103, a network 104 and an electronic device 105. The network 104 serves as a medium providing a communication link between the camera 103 and the electronic device 105. The network 104 may include various types of connections, such as wired or wireless transmission links, or optical fibers.

A user may initiate the multi-beam lidar 102, enable the multi-beam lidar 102 to scan the checkerboard calibration plate 101, and then initiate the camera 103 to take a photo of the checkerboard calibration plate 101 when the checkerboard calibration plate 101 is scanned by the multi-beam lidar 102.

It should be noted that the camera 103 may be a camera capable of photographing a laser beam emitted by the multi-beam lidar 102. For example, when the laser beam emitted by the multi-beam lidar 102 is infrared light, the camera 103 may be an infrared camera.

It should be noted that a pattern in the checkerboard calibration plate provided in the embodiment of the present disclosure is not limited to a black and white square checkerboard. In practice, various checkerboards arranged at intervals with regularity may be used, for example, black and white rhombuses, equicrural triangles in different colors arranged at intervals, and so on.

The electronic device 105 may be various electronic devices capable of computing, including but not limited to smart phones, tablet computers, laptops, desktop computers, desk computers, and the like. The electronic device 105 may analyze an image acquired from the camera 103, and obtain the angular resolution of the multi-beam lidar.

It should be noted that the method for measuring an angular resolution of a multi-beam lidar provided in the embodiment of the present disclosure is generally executed by the electronic device 105. Accordingly, the apparatus for measuring an angular resolution of a multi-beam lidar is generally installed on the electronic device 105.

It should be appreciated that the numbers of checkerboard calibration plates, multi-beam lidars, cameras, networks and electronic devices in FIG. 1 are only illustrative. Any number of checkerboard calibration plates, multi-beam lidars, cameras, networks and electronic devices may be provided based on the actual requirements.

Figure 2:
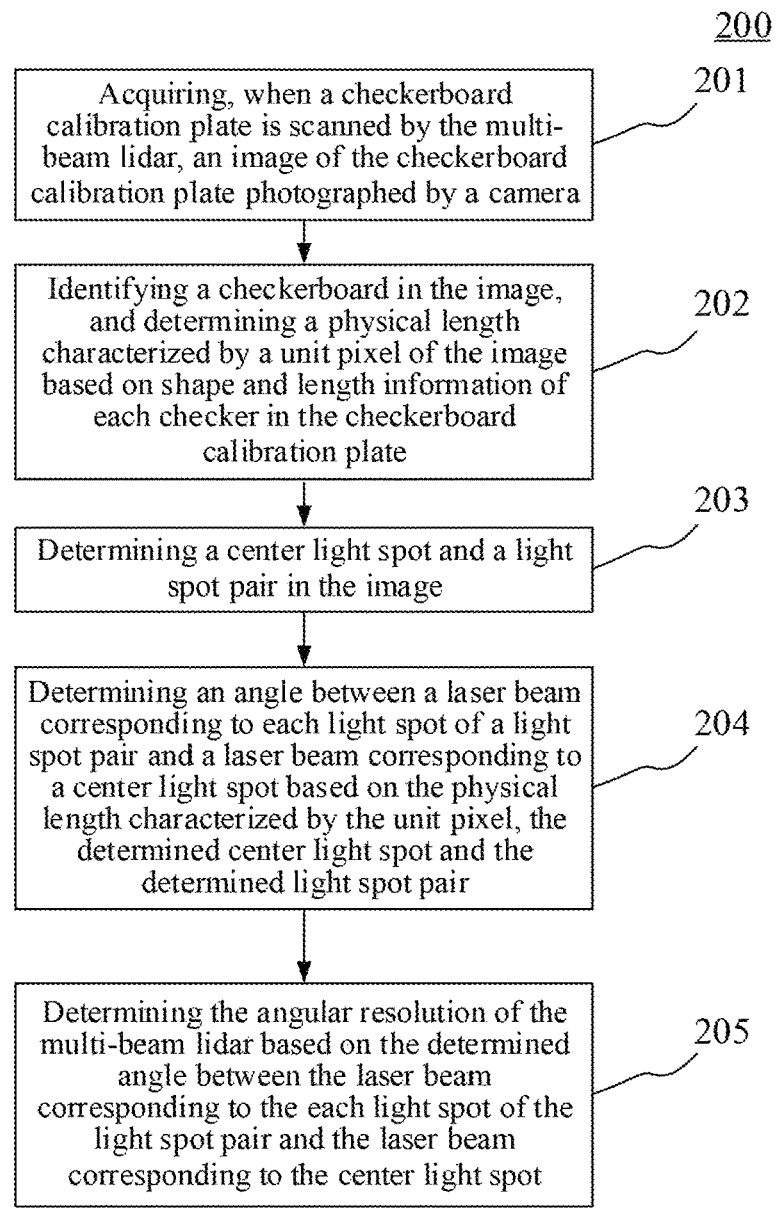
FIG. 2 is a flowchart diagram of an embodiment of a method for measuring an angular resolution of a multi-beam lidar according to the present disclosure.

By further referring to FIG. 2, a flow 200 of an embodiment of a method for measuring an angular resolution of a multi-beam lidar according to the present disclosure is shown. Here, the multi-beam lidar includes a center axis and at least one laser emitter, each laser emitter of the at least one laser emitter rotates around the center axis, and the method for measuring an angular resolution of the multi-beam lidar includes the following steps.

Step 201: acquiring, when a checkerboard calibration plate is scanned by the multi-beam lidar, an image of the checkerboard calibration plate photographed by a camera.

In the embodiment, an electronic device (for example, an electronic device as shown in FIG. 1) on which a method for measuring an angular resolution of a multi-beam lidar is performed may first acquire, when a checkerboard calibration plate is scanned by the multi-beam lidar, an image of the checkerboard calibration plate photographed by a camera, in order to measure the angular resolution of the multi-beam lidar.

In some optional implementations of the embodiment, the camera may be an infrared camera.

In the embodiment, the electronic device may acquire, when a checkerboard calibration plate is scanned by the multi-beam lidar, an image of the checkerboard calibration plate photographed by a camera, from the camera by way of a wired connection or by way of a wireless connection. It should be noted that the wireless connection type may include, but is not limited to, 3G/4G connection, WiFi connection, Bluetooth connection, WiMAX connection, Zigbee connection, UWB (ultra wideband) connection, and other wireless connections that are known at present or are to be developed in the future.

Step 202: identifying a checkerboard in the image, and determining a physical length characterized by a unit pixel of the image based on shape and length information of each checker in the checkerboard calibration plate.

In the embodiment, the electronic device may first identify a checkerboard in the image, and then determine a physical length characterized by a unit pixel of the image based on shape and length information of each checker in the checkerboard calibration plate.

Since the checkerboard calibration plate presents checkers arranged at intervals with regularity, each of the checkers has preset shape, color and length information. For example, the shape may be a square, a triangle, a parallelogram, or the like, while the color may be black, white, red, green, blue, or the like. In practice, colors with a great discriminability may be used in the checkerboard calibration plate as far as possible to facilitate identifying the checkerboard.

Therefore, the electronic device may identify the checkerboard in the acquired image using an image recognition method.

It should be noted that the method for identifying a checkerboard in an image is a well-known technique, which is widely researched and applied at present, and will not be repeatedly described any more here.

For example, the electronic device may input the acquired image into a pre-trained checkerboard recognition model to generate coordinate information of the checkerboard included in the image, where the checkerboard recognition model is used for characterizing a correspondence between a to-be-identified image and coordinate information of a checkerboard. As an example, a checkerboard recognition model may be obtained through training an initial neural network model using a large number of training images annotated with coordinate information of a checkerboard as training data.

After identifying the checkerboard, a physical length characterized by a unit pixel of the image may be determined based on preset shape and length information of a checker in the identified checkerboard. As an example, assume that a checker is a square, then a pixel count corresponding to a side of the square checker in an image may be calculated based on coordinates of four vertices of the identified square checker, and then a physical length characterized by a unit pixel of the image may be obtained through dividing a preset side length of the square checker by the calculated pixel count. It may be appreciated that the electronic device may also repeat the operations a plurality of times to obtain a plurality of physical lengths characterized by the unit pixel, and then determine an average value of the plurality of physical lengths characterized by the unit pixel as the physical length characterized by the unit pixel in the image.

Step 203: determining a center light spot and a light spot pair in the image.

In the embodiment, the electronic device on which the method for measuring an angular resolution of a multi-beam lidar is performed may determine a center light spot and a light spot pair in the image acquired in the step 201. Here, the center light spot is an image of a laser beam perpendicular to the checkerboard calibration plate among laser beams emitted by at least one laser emitter of a multi-beam lidar in the acquired image, and the light spot pair is two images of two laser beams emitted by two adjacent laser emitters of at least one laser emitter of a multi-beam lidar in the acquired image.

In some optional implementations of the embodiment, after the step 201, a center light spot and a light spot pair may be annotated by a person skilled in the art using various annotation tools. Thus, the electronic device may determine a center light spot and a light spot pair through acquiring a manually annotated center light spot and a manually annotated light spot pair. As an example, a person skilled in the art may annotate center point coordinates and a radius of a center light spot, and center point coordinates and a radius of each light spot of a light spot pair. Or the person skilled in the art may annotate a contour of the center light spot, and the contour and pixels within the contour constitute the center light spot. Similarly, each light spot in the light spot pair may be annotated in a similar way.

In some optional implementations of the embodiment, the electronic device may also find a pixel with a highest brightness in the acquired image, define the pixel as the center point of the center light spot, define the brightness of the pixel as the highest brightness, and then obtain a circle through expanding outward with the pixel as the center of the circle, and continue expanding outward if a difference between brightness of each pixel within the circle obtained through expansion and the highest brightness is less than a preset brightness difference threshold. If the difference is greater than or equal to the preset brightness difference threshold, the electronic device may stop the expansion, and determine the circle obtained through the current expansion, pixels within the circle being the center light spot, and the pixel with the highest brightest being the center point of the center light spot. Only the laser beam corresponding to the center light spot is perpendicular to the checkerboard calibration plate, i.e., the laser emitter emitting the center light spot is nearest to the checkerboard calibration plate among the at least one laser emitter of the multi-beam lidar, and accordingly the laser beam emitted by the laser emitter has the highest light intensity on the checkerboard calibration plate.

Step 204: determining an angle between a laser beam corresponding to each light spot of a light spot pair and a laser beam corresponding to a center light spot based on the physical length characterized by the unit pixel, the determined center light spot and the determined light spot pair.

In the embodiment, the electronic device may determine an angle between a laser beam corresponding to each light spot of the light spot pair and a laser beam corresponding to the center light spot based on the physical length character- ized by the unit pixel, the determined center light spot and the determined light spot pair. Here, the laser beam corresponding to a center light spot is a laser beam with a projection on the checkerboard calibration plate being the center light spot among laser beams emitted by at least one laser emitter of the multi-beam lidar. Likewise, the laser beam corresponding to each light spot of a light spot pair is a laser beam with a projection on the checkerboard calibration plate being the each light spot among laser beams emitted by at least one laser emitter of the multi-beam lidar.

In some optional implementations of the embodiment, the step 204 may be implemented as follows.

First, center point coordinates of a center light spot and center point coordinates of each light spot of a light spot pair may be determined. As an example, if center point coordinates and a radius of a center light spot are determined in the step 203, then center point coordinates of the center light spot may be directly determined, and center point coordinates of each light spot of the light spot pair may be determined in a similar way. If a contour of a center light spot is determined in the step 203, then coordinates of a pixel with a minimum sum of distance from each pixel on the contour may be found from pixels within the contour of the center light spot, and coordinates of the pixel may be defined as center point coordinates of the center light spot. Center point coordinates of each light spot of the light spot pair may be determined in a similar way.

Then, a pixel distance between the center point coordinates of each light spot of the light spot pair and the center point coordinates of the center light spot may be calculated.

Finally, for each light spot of the light spot pair, a product obtained through multiplying the calculated pixel distance between the center point coordinates of the each light spot and the center point coordinates of the center light spot by a preset coefficient is determined as an angle between a laser beam corresponding to the each light spot and a leaser beam corresponding to the center light spot. That is, the closer is the each light spot to the center light spot, the smaller is the angle between the laser beam corresponding to the each light spot and the laser beam corresponding to the center light spot, and otherwise, the farther is the each light spot to the center light spot, the larger is the angle between the laser beam corresponding to the each light spot and the laser beam corresponding to the center light spot.

In some optional implementations of the embodiment, the center axis of the multi-beam lidar may be parallel to the checkerboard calibration plate. In this case, the step 204 may also be implemented as follows.

An angle is determined for each light spot of a light spot pair as follows.

First, a pixel distance between the each light spot and the center light spot in an axial direction is determined. Here, the axial direction is a direction of a projection of the center axis of the multi-beam lidar on the checkerboard calibration plate. As an example, the pixel distance between the each light spot and the center light spot in the axial direction may be a pixel distance between center point coordinates of the each light spot and center point coordinates of the center light spot in the axial direction.

As an example, the axial direction may be pre-annotated in the image by a person skilled in the art using various annotation tools.

As an example, usually a laser beam emitted by a laser emitter of a multi-beam lidar in the image acquired in the step 201 has more than one projection on a checkerboard calibration plate, because the laser emitter continuously scans the checkerboard calibration plate in the process of rotating around the central axis, and the camera exposure duration is generally longer than a scanning cycle of the laser emitter. Therefore, the camera may collect a plurality of images of the checkerboard calibration plate scanned by a given laser emitter, and the images are connected and approximate to a line on the whole. Similarly, images of the laser beam corresponding to the center light spot on the checkerboard calibration plate may also be connected and approximate to a line on the whole, and the line corresponding to the center light spot may be perpendicular to a projection of the center axis on the checkerboard calibration plate. Therefore, the electronic device may find a pixel with a highest brightness in the image, then find a line with the pixel as one point on the line and a brightness difference from the pixel smaller than a preset brightness difference threshold, and then determine the direction perpendicular to the found line as an axial direction.

Then, a distance between a projection of the laser beam corresponding to the each light spot on the checkerboard calibration plate and a projection of the laser beam corresponding to the center light spot on the checkerboard calibration plate is determined based on the determined pixel distance and the physical length characterized by the unit pixel. Specifically, a product obtained through multiplying the determined pixel distance by the physical length characterized by the unit pixel may be determined as the distance between a projection of the laser beam corresponding to the each light spot on the checkerboard calibration plate and a projection of the laser beam corresponding to the center light spot on the checkerboard calibration plate.

Finally, the angle between the laser beam corresponding to the each light spot and the laser beam corresponding to the center light spot is determined based on the determined distance. Specifically, because the laser beam corresponding to the center light spot is perpendicular to the checkerboard calibration plate, and the center axis is parallel to the checkerboard calibration plate, i.e., the laser beam corresponding to the center light spot is perpendicular to a projection of the center axis on the checkerboard calibration plate, that is, the laser beam corresponding to the center light spot and the projection of the center axis on the checkerboard calibration plate form a right angle.

Figure 3:
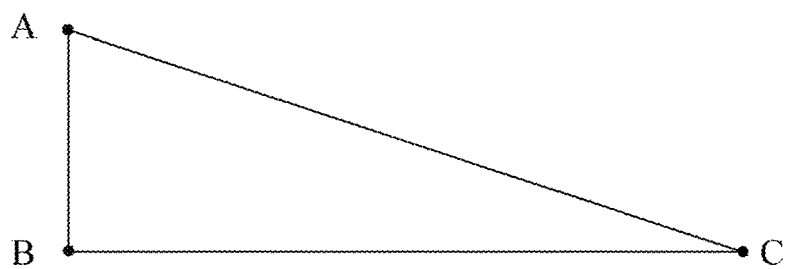
FIG. 3 is a schematic diagram of an embodiment of determining an angle between a laser beam corresponding to a light spot and a laser beam corresponding to a center light spot based on a determined distance according to the present disclosure.

As shown in FIG. 3, a point A, a point B and a point C may form a right triangle $\triangle ABC$, where the point A is a projection of center point coordinates of the each light spot in an axial direction, the point B is center point coordinates of the center light spot, the point C is a location of a laser emitter emitting a laser beam corresponding to the center light spot on the center axis, $\angle ABC$ is a right angle, and $\angle BCA$ is an acute angle. In practice, a mounting distance between different laser emitters of the multi-beam lidar is usually small, and may be negligible. Here, assume that the point C is also a location of a laser emitter emitting a laser beam corresponding to the each light spot on the center axis, i.e., assume that the $\angle BCA$ is a to-be-determined angle between a laser beam corresponding to the each light spot and the laser beam corresponding to the center light spot, and the $\angle BCA$ corresponds to a side AB, then a length of the side AB is the determined distance, and a length of a side BC is a distance between the center axis of the multi-beam lidar and the checkerboard calibration plate. Then the angle between the laser beam corresponding to the each light spot and the laser beam corresponding to the center light spot may be determined as follows.

First, a ratio of the determined distance to a distance between the checkerboard calibration plate and the center axis is calculated. For the $\triangle ABC$, a ratio of the length of the side AB to the length of the side BC is calculated, that is, the calculated ratio is the tangent value of the $\angle BCA$.

Then, an arctangent angle of the calculated ratio is determined as the angle between the laser beam corresponding to the each light spot and the laser beam corresponding to the center light spot. For the $\triangle ABC$, a size of the $\angle BCA$ is determined.

Step 205: determining the angular resolution of the multi-beam lidar based on the determined angle between the laser beam corresponding to the each light spot of the light spot pair and the laser beam corresponding to the center light spot.

In the embodiment, the electronic device may determine the angular resolution of the multi-beam lidar based on the determined angle between the laser beam corresponding to the each light spot of the light spot pair and the laser beam corresponding to the center light spot.

In some optional implementations of the embodiment, the step 205 may be implemented as follows.

First, an angular difference between an angle between a laser beam corresponding to a light spot of the light spot pair and the laser beam corresponding to the center light spot and an angle between a laser beam corresponding to another light spot of the light spot pair and the laser beam corresponding to the center light spot is calculated.

Figure 4:
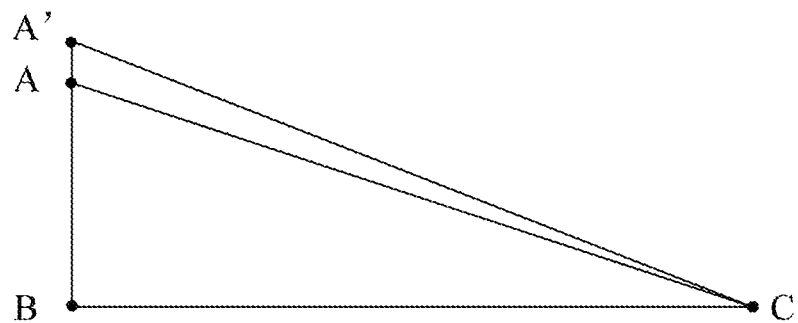
FIG. 4 is a schematic diagram of an embodiment of calculating an angular difference between an angle between a laser beam corresponding to a light spot of a light spot pair and a laser beam corresponding to a center light spot and an angle between a laser beam corresponding to another light spot of the light spot pair and the laser beam corresponding to the center light spot according to the present disclosure.

As shown in FIG. 4, the point A, the point B, and the point C may form a right triangle $\triangle ABC$, and the point A', the point B, and the point C may form a right triangle $\triangle A'BC$, where the point A is a projection of center point coordinates of a light spot of a light spot pair in an axial direction, the point A' is a projection of center point coordinates of another light spot of the light spot pair in the axial direction, the point B is center point coordinates of the center light spot, the point C is a location of a laser emitter emitting a laser beam corresponding to the center light spot on the center axis, $\angle ABC$ and $\angle A'BC$ are right angles, and $\angle BCA$ and $\angle BCA'$ are acute angles. Similarly, assume that the $\angle BCA$ is a determined angle between a laser beam corresponding to a light spot of the light spot pair and the laser beam corresponding to the center light spot, and assume that the $\angle BCA'$ is a determined angle between a laser beam corresponding to another light spot of the light spot pair and the laser beam corresponding to the center light spot, then an angular difference between the $\angle BCA'$ and the $\angle BCA$ is $\angle ABC$. Similarly, assume that the $\angle ABC$ is an angle between a laser beam corresponding to a laser beam of the light spot pair and the laser beam corresponding to another light spot of the light spot pair. Two light spots of a light spot pair are images of two laser beams emitted by two adjacent laser emitters of at least one laser emitter of a multi-beam lidar on a checkerboard calibration plate, and an angle between a laser beam corresponding to a light spot of the light spot pair and a laser beam corresponding to another light spot of the light spot pair is equivalent to an angular resolution between the two adjacent laser emitters.

Then the calculated angular difference is defined as the angular resolution of the multi-beam lidar.

Here, the calculated angular resolution between the two adjacent laser emitters of the at least one laser emitter of the multi-beam lidar may be considered as the angular resolution of the multi-beam lidar. Therefore, the calculated angular difference may be defined as the angular resolution of the multi-beam lidar. This calculation process is simple, and may quickly obtain an angular resolution of a multi-beam lidar.

In some optional implementations of the embodiment, a light spot pair determined in an image in the step 203 may be at least one light spot pair, and an angle between a laser beam corresponding to each light spot of each light spot pair among at least one light spot pair and a laser beam corresponding to a center light spot may be determined in the step 204. In this case, the step 205 may also be executed as follows.

First, an angular difference between an angle between a laser beam corresponding to a light spot of each light spot pair among at least one light spot pair and the laser beam corresponding to the center light spot and an angle between a laser beam corresponding to another light spot of the each light spot pair and the laser beam corresponding to the center light spot is calculated.

Then an average value of the calculated angular differences is determined as the angular resolution of the multi-beam lidar. Here, in order to avoid an inaccurate single measurement, an average value of angular resolutions obtained from multiple measurements may be used to improve the accuracy of measurements.

A method provided by the embodiment of the present disclosure acquires, when a checkerboard calibration plate is scanned by a multi-beam lidar, an image of the checkerboard calibration plate photographed by a camera; then identifies a checkerboard in the image, and determines a physical length characterized by a unit pixel of the image based on shape and length information of each checker in the checkerboard calibration plate; then determines a center light spot and a light spot pair in the image; then determines an angle between a laser beam corresponding to each light spot of the light spot pair and a laser beam corresponding to the center light spot based on the physical length characterized by the unit pixel, the determined center light spot and the determined light spot pair; and finally determines the angular resolution of the multi-beam lidar based on the determined angle between the laser beam corresponding to the each light spot of the light spot pair and the laser beam corresponding to the center light spot. Thus the embodiment has realized measuring the angular resolution of the multi-beam lidar at a low cost, and has improved the reliability of the angular resolution parameter of the multi-beam lidar.

Figure 5:
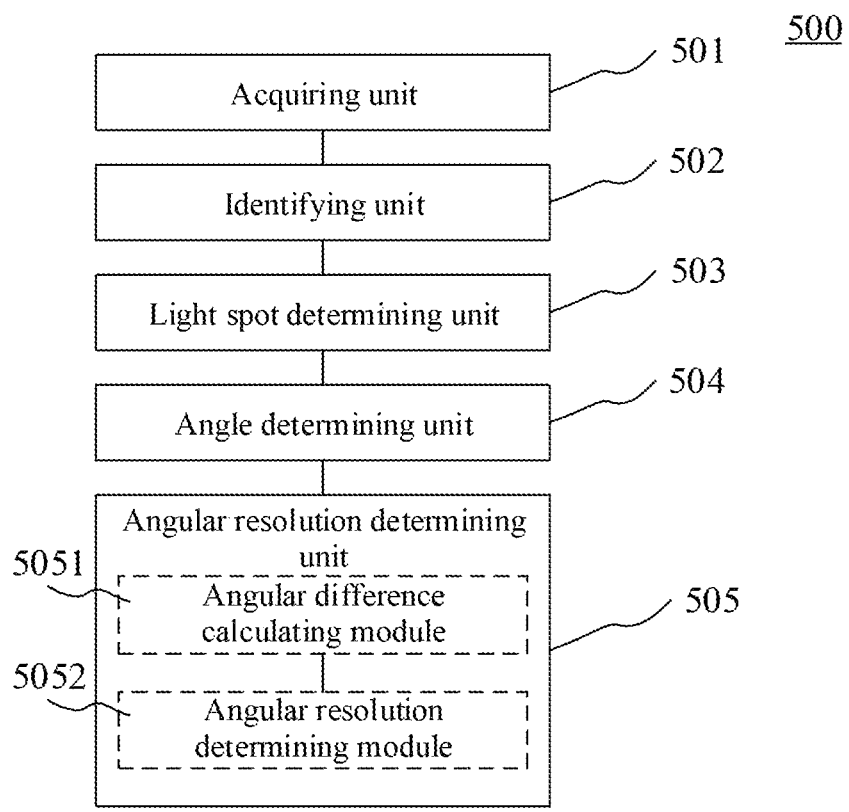
FIG. 5 is a schematic structural diagram of an embodiment of an apparatus for measuring an angular resolution of a multi-beam lidar according to the present disclosure.

By further referring to FIG. 5, as implementations of the methods shown in above figures, the present disclosure provides an embodiment of an apparatus for measuring an angular resolution of a multi-beam lidar, where the multi-beam lidar includes a center axis and at least one laser emitter, and each laser emitter of the at least one laser emitter rotates around the center axis. The embodiment of the apparatus corresponds to the embodiment of the method shown in FIG. 2, and the apparatus may be applied to various electronic devices.

As shown in FIG. 5, the apparatus 500 for measuring an angular resolution of a multi-beam lidar according to the embodiment includes: an acquiring unit 501, an identifying unit 502, a light spot determining unit 503, an angle determining unit 504, and an angular resolution determining unit 505. Here, the acquiring unit 501 is configured for acquiring, when a checkerboard calibration plate is scanned by the multi-beam lidar, an image of the checkerboard calibration plate photographed by a camera; the identifying unit 502 is configured for identifying a checkerboard in the image, and determining a physical length characterized by a unit pixel of the image based on shape and length information of each checker in the checkerboard calibration plate; the light spot determining unit 503 is configured for determining a center light spot and a light spot pair in the image, the center light spot being an image of a laser beam perpendicular to the checkerboard calibration plate among laser beams emitted by the at least one laser emitter in the image, and the light spot pair being two images of two laser beams emitted by two adjacent laser emitters of the at least one laser emitter in the image; the angle determining unit 504 is configured for determining an angle between a laser beam corresponding to each light spot of the light spot pair and a laser beam corresponding to the center light spot based on the physical length characterized by the unit pixel, the determined center light spot and the determined light spot pair; and the angular resolution determining unit 505 is configured for determining the angular resolution of the multi-beam lidar based on the determined angle between the laser beam corresponding to the each light spot of the light spot pair and the laser beam corresponding to the center light spot.

In the embodiment, specific processing of the acquiring unit 501, the recognition unit 502, the light spot determining unit 503, the angle determining unit 504 and the angular resolution determining unit 505 of the apparatus 500 for measuring an angular resolution of a multi-beam lidar and technical effects thereof may be respectively referred to relevant description of the steps 201, 202, 203, 204 and 205 in the embodiment corresponding to FIG. 2, and are not repeatedly described any more here.

In some optional implementations of the embodiment, the angle determining unit 504 may be further configured for: determining the angle for the each light spot of the light spot pair as follows: determining a pixel distance between the each light spot and the center light spot in an axial direction, the axial direction being a direction of a projection of the center axis on the checkerboard calibration plate; determining a distance between a projection of the laser beam corresponding to the each light spot on the checkerboard calibration plate and a projection of the laser beam corresponding to the center light spot on the checkerboard calibration plate based on the determined pixel distance and the physical length characterized by the unit pixel; and determining the angle between the laser beam corresponding to the each light spot and the laser beam corresponding to the center light spot based on the determined distance.

In some optional implementations of the embodiment, the center axis may be parallel to the checkerboard calibration plate; and the angle determining unit 504 may include: a ratio calculating module, configured for calculating a ratio of the determined distance to a distance between the checkerboard calibration plate and the center axis; and an angle determining module, configured for determining an arctangent angle of the calculated ratio as the angle between the laser beam corresponding to the each light spot and the laser beam corresponding to the center light spot.

In some optional implementations of the embodiment, the angular resolution determining unit 505 includes: an angular difference calculating module 5051, configured for calculating an angular difference between an angle between a laser beam corresponding to a light spot of the light spot pair and the laser beam corresponding to the center light spot and an angle between a laser beam corresponding to another light spot of the light spot pair and the laser beam corresponding to the center light spot; and an angular resolution determining module 5052, configured for defining the calculated angular difference as the angular resolution of the multi-beam lidar.

In some optional implementations of the embodiment, the camera is an infrared camera.

Figure 6:
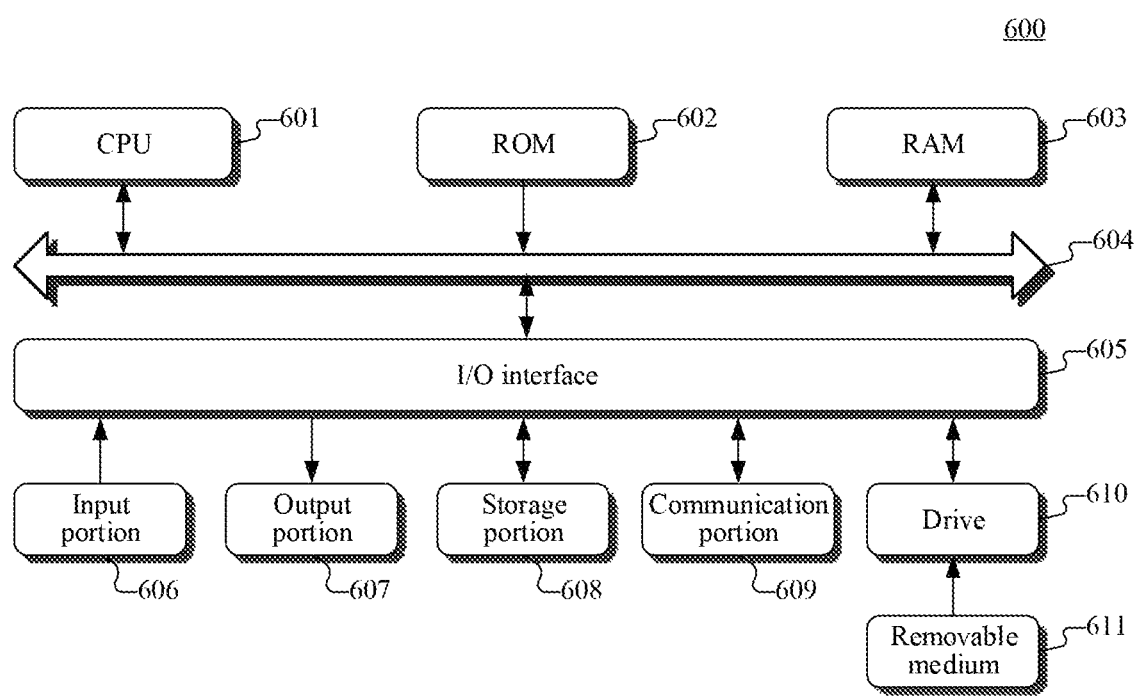
FIG. 6 is a schematic structural diagram of a computer system suitable for implementing an electronic device according to an embodiment of the present disclosure.

Referring to FIG. 6, a schematic structural diagram of a computer system 600 adapted to implement an electronic device of the embodiments of the present disclosure is shown. The electronic device shown in FIG. 6 is merely an example, and should not bring any limitations to the functions and the scope of use of the embodiments of the present disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 609, and/or may be installed from the removable media 611. The computer program, when executed by the central processing unit (CPU) 601, implements the above mentioned functionalities as defined by the methods of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. In the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, described as: a processor, comprising an acquiring unit, an identifying unit, a light spot determining unit, an angle determining unit, and an angular resolution determining unit, where the names of these units do not in some cases constitute a limitation to such units or modules themselves. For example, the acquiring unit may also be described as "a unit for acquiring an image".

In another aspect, the present disclosure further provides a computer-readable storage medium. The computer-readable storage medium may be the computer storage medium included in the apparatus in the above described embodiments, or a stand-alone computer-readable storage medium not assembled into the apparatus. The computer-readable storage medium stores one or more programs. The one or more programs, when executed by an apparatus, cause the apparatus to: acquiring, when a checkerboard calibration plate is scanned by the multi-beam lidar, an image of the checkerboard calibration plate photographed by a camera; identifying a checkerboard in the image, and determining a physical length characterized by a unit pixel of the image based on shape and length information of each checker in the checkerboard calibration plate; determining a center light spot and a light spot pair in the image, the center light spot being an image of a laser beam perpendicular to the checkerboard calibration plate among laser beams emitted by the at least one laser emitter in the image, and the light spot pair being two images of two laser beams emitted by two adjacent laser emitters of the at least one laser emitter in the image; determining an angle between a laser beam corresponding to each light spot of the light spot pair and a laser beam corresponding to the center light spot based on the physical length characterized by the unit pixel, the determined center light spot and the determined light spot pair; and determining the angular resolution of the multi-beam lidar based on the determined angle between the laser beam corresponding to the each light spot of the light spot pair and the laser beam corresponding to the center light spot.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for measuring an angular resolution of a multi-beam lidar, the multi-beam lidar comprising a center axis and at least one laser emitter, each laser emitter of the at least one laser emitter rotating around the center axis, the method comprising:
   acquiring, when a checkerboard calibration plate is scanned by the multi-beam lidar, an image of the checkerboard calibration plate photographed by a camera;
   identifying a checkerboard in the image, and determining a physical length characterized by a unit pixel of the image based on shape and length information of each checker in the checkerboard calibration plate;
   determining a center light spot and a light spot pair in the image, the center light spot being an image of a laser beam perpendicular to the checkerboard calibration plate among laser beams emitted by the at least one laser emitter in the image, and the light spot pair being two images of two laser beams emitted by two adjacent laser emitters of at least two laser emitters in the image;
   determining an angle between a laser beam corresponding to each light spot of the light spot pair and a laser beam corresponding to the center light spot based on the physical length characterized by the unit pixel, the determined center light spot and the determined light spot pair; and
   determining the angular resolution of the multi-beam lidar based on the determined angle between the laser beam corresponding to the each light spot of the light spot pair and the laser beam corresponding to the center light spot.

2. The method according to claim 1, wherein the determining an angle between a laser beam corresponding to each light spot of the light spot pair and a laser beam corresponding to the center light spot based on the physical length characterized by the unit pixel, the determined center light spot and the determined light spot pair comprises:
   determining the angle for the each light spot of the light spot pair as follows: determining a pixel distance between the each light spot and the center light spot in an axial direction, the axial direction being a direction of a projection of the center axis on the checkerboard calibration plate; determining a distance between a projection of the laser beam corresponding to the each light spot on the checkerboard calibration plate and a projection of the laser beam corresponding to the center light spot on the checkerboard calibration plate based on the determined pixel distance and the physical length characterized by the unit pixel; and determining the angle between the laser beam corresponding to the each light spot and the laser beam corresponding to the center light spot based on the determined distance.

3. The method according to claim 2, wherein the center axis is parallel to the checkerboard calibration plate; and
   the determining the angle between the laser beam corresponding to the each light spot and the laser beam corresponding to the center light spot based on the determined distance comprises:
   calculating a ratio of the determined distance to a distance between the checkerboard calibration plate and the center axis; and
   determining an arctangent angle of the calculated ratio as the angle between the laser beam corresponding to the each light spot and the laser beam corresponding to the center light spot.

4. The method according to claim 3, wherein the determining the angular resolution of the multi-beam lidar based on the determined angle between a laser beam corresponding to each light spot of the light spot pair and a laser beam corresponding to the center light spot comprises:
   calculating an angular difference between an angle between a laser beam corresponding to a light spot of the light spot pair and the laser beam corresponding to the center light spot and an angle between a laser beam corresponding to another light spot of the light spot pair and the laser beam corresponding to the center light spot; and
   defining the calculated angular difference as the angular resolution of the multi-beam lidar.

5. The method according to claim 1, wherein the camera is an infrared camera.

6. An apparatus for measuring an angular resolution of a multi-beam lidar, the multi-beam lidar comprising a center axis and at least one laser emitter, each laser emitter of the at least one laser emitter rotating around the center axis, the apparatus comprising:
   at least one processor; and
   a memory storing instructions, the instructions when executed by the at least one processor, cause the at least one processor to perform operations, the operations comprising:
   acquiring, when a checkerboard calibration plate is scanned by the multi-beam lidar, an image of the checkerboard calibration plate photographed by a camera;
   identifying a checkerboard in the image, and determining a physical length characterized by a unit pixel of the image based on shape and length information of each checker in the checkerboard calibration plate;
   determining a center light spot and a light spot pair in the image, the center light spot being an image of a laser beam perpendicular to the checkerboard calibration plate among laser beams emitted by the at least one laser emitter in the image, and the light spot pair being two images of two laser beams emitted by two adjacent laser emitters of at least two laser emitters in the image;
   determining an angle between a laser beam corresponding to each light spot of the light spot pair and a laser beam corresponding to the center light spot based on the physical length characterized by the unit pixel, the determined center light spot and the determined light spot pair; and
   determining the angular resolution of the multi-beam lidar based on the determined angle between the laser beam corresponding to the each light spot of the light spot pair and the laser beam corresponding to the center light spot.

7. The apparatus according to claim 6, wherein the determining an angle between a laser beam corresponding to each light spot of the light spot pair and a laser beam corresponding to the center light spot based on the physical length characterized by the unit pixel, the determined center light spot and the determined light spot pair comprises:

determining the angle for the each light spot of the light spot pair as follows: determining a pixel distance between the each light spot and the center light spot in an axial direction, the axial direction being a direction of a projection of the center axis on the checkerboard calibration plate; determining a distance between a projection of the laser beam corresponding to the each light spot on the checkerboard calibration plate and a projection of the laser beam corresponding to the center light spot on the checkerboard calibration plate based on the determined pixel distance and the physical length characterized by the unit pixel; and determining the angle between the laser beam corresponding to the each light spot and the laser beam corresponding to the center light spot based on the determined distance.

8. The apparatus according to claim 7, wherein the center axis is parallel to the checkerboard calibration plate; and the determining the angle between the laser beam corresponding to the each light spot and the laser beam corresponding to the center light spot based on the determined distance comprises:

calculating a ratio of the determined distance to a distance between the checkerboard calibration plate and the center axis; and determining an arctangent angle of the calculated ratio as the angle between the laser beam corresponding to the each light spot and the laser beam corresponding to the center light spot.

9. The apparatus according to claim 8, wherein the determining the angular resolution of the multi-beam lidar based on the determined angle between a laser beam corresponding to each light spot of the light spot pair and a laser beam corresponding to the center light spot comprises:

calculating an angular difference between an angle between a laser beam corresponding to a light spot of the light spot pair and the laser beam corresponding to the center light spot and an angle between a laser beam corresponding to another light spot of the light spot pair and the laser beam corresponding to the center light spot; and defining the calculated angular difference as the angular resolution of the multi-beam lidar.

10. The apparatus according to claim 6, wherein the camera is an infrared camera.

11. A non-transitory computer storage medium storing a computer program for measuring an angular resolution of a multi-beam lidar, the multi-beam lidar comprising a center axis and at least one laser emitter, each laser emitter of the at least one laser emitter rotating around the center axis, the computer program when executed by one or more processors, causes the one or more processors to perform operations, the operations comprising:

acquiring, when a checkerboard calibration plate is scanned by the multi-beam lidar, an image of the checkerboard calibration plate photographed by a camera;

identifying a checkerboard in the image, and determining a physical length characterized by a unit pixel of the image based on shape and length information of each checker in the checkerboard calibration plate;

determining a center light spot and a light spot pair in the image, the center light spot being an image of a laser beam perpendicular to the checkerboard calibration plate among laser beams emitted by the at least one laser emitter in the image, and the light spot pair being two images of two laser beams emitted by two adjacent laser emitters of at least two laser emitters in the image;

determining an angle between a laser beam corresponding to each light spot of the light spot pair and a laser beam corresponding to the center light spot based on the physical length characterized by the unit pixel, the determined center light spot and the determined light spot pair; and determining the angular resolution of the multi-beam lidar based on the determined angle between the laser beam corresponding to the each light spot of the light spot pair and the laser beam corresponding to the center light spot.

* * * * *